United States Patent
Quix et al.

(10) Patent No.: US 10,458,369 B2
(45) Date of Patent: Oct. 29, 2019

(54) SUPERCHARGED INTERNAL COMBUSTION ENGINE WITH COOLED EXHAUST-GAS RECIRCULATION ARRANGEMENT

(71) Applicant: Ford Global Technologies, LLC, Dearborn, MI (US)

(72) Inventors: Hans Guenter Quix, Herzogenrath (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/716,409

(22) Filed: Sep. 26, 2017

(65) Prior Publication Data

US 2018/0094610 A1 Apr. 5, 2018

(30) Foreign Application Priority Data

Sep. 30, 2016 (DE) .......................... 10 2016 218 990

(51) Int. Cl.
| | | |
|---|---|---|
| *F02M 26/24* | (2016.01) | |
| *F02M 26/15* | (2016.01) | |
| *F02M 26/09* | (2016.01) | |
| *F02M 26/04* | (2016.01) | |

(52) U.S. Cl.
CPC .......... *F02M 26/24* (2016.02); *F02M 26/04* (2016.02); *F02M 26/09* (2016.02); *F02M 26/15* (2016.02)

(58) Field of Classification Search
CPC ........ F02M 26/24; F02M 26/04; F02M 26/09; F02M 26/15
USPC ........................................ 60/600, 605.2, 611
See application file for complete search history.

(56) References Cited

U.S. PATENT DOCUMENTS

| | | | | |
|---|---|---|---|---|
| 6,062,027 A | * | 5/2000 | Landfahrer | F02B 37/00 60/605.2 |
| 7,461,641 B1 | * | 12/2008 | Styles | F02M 26/19 123/568.12 |
| 8,132,407 B2 | | 3/2012 | Li et al. | |
| 8,205,443 B2 | | 6/2012 | Pegg et al. | |
| 8,250,865 B2 | * | 8/2012 | Pearson | F02M 26/24 123/41.08 |
| 8,359,845 B2 | | 1/2013 | Prior et al. | |
| 8,746,327 B2 | | 6/2014 | Mooij | |
| 8,938,964 B2 | | 1/2015 | Kanou et al. | |
| 9,021,808 B2 | | 5/2015 | Nelson et al. | |
| 2009/0217660 A1 | * | 9/2009 | Ranini | F02B 29/0412 60/599 |

(Continued)

FOREIGN PATENT DOCUMENTS

| | | |
|---|---|---|
| DE | 102008020408 A1 | 10/2009 |
| DE | 102008064015 A1 | 7/2010 |

(Continued)

OTHER PUBLICATIONS

Zhang, Xiaogang, "Methods and Systems for a Heat Exchanger," U.S. Appl. No. 15/710,651, filed Sep. 20, 2017, 55 pages.

*Primary Examiner* — Hoang M Nguyen
(74) *Attorney, Agent, or Firm* — Geoffrey Brumbaugh; McCoy Russell LLP

(57) ABSTRACT

Methods and systems are provided for a cooling arrangement. In one example, a method for the cooling arrangement may comprise adjusting exhaust-gas recirculate and/or exhaust gas flow to first and second coolers of the cooling arrangement in response to one or more of an exhaust-gas recirculate demand and an energy recovery demand.

19 Claims, 6 Drawing Sheets

(56) References Cited

U.S. PATENT DOCUMENTS

| | | | |
|---|---|---|---|
| 2013/0333673 A1 | 12/2013 | Frick et al. | |
| 2015/0377180 A1 | 12/2015 | Jacquot et al. | |
| 2016/0177887 A1* | 6/2016 | Fischer | F02M 26/04 60/605.2 |

FOREIGN PATENT DOCUMENTS

| | | | |
|---|---|---|---|
| EP | 1099847 | A2 | 5/2001 |
| EP | 2025912 | A1 | 2/2009 |
| WO | 2006136372 | A1 | 12/2006 |

\* cited by examiner

SUPERCHARGED INTERNAL COMBUSTION ENGINE WITH COOLED EXHAUST-GAS RECIRCULATION ARRANGEMENT

CROSS REFERENCE TO RELATED APPLICATION

The present application claims priority to German Patent Application No. 102016218990.5, filed Sep. 30, 2016. The entire contents of the above-referenced application are hereby incorporated by reference in its entirety for all purposes.

FIELD

The present description relates generally to methods and systems for controlling a combined low-pressure exhaust gas recirculation (LP-EGR) and heat recovery system with EGR cooling and heat recovery functionality.

BACKGROUND/SUMMARY

An internal combustion engine of the stated type is used as a motor vehicle drive unit. Within the context of the present disclosure, the expression "internal combustion engine" encompasses diesel engines and Otto-cycle engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

In the development of internal combustion engines, it is sought to minimize fuel consumption. Furthermore, a reduction of the pollutant emissions is sought in order to be able to comply with future limit values for pollutant emissions.

Internal combustion engines are ever more commonly being equipped with supercharging, wherein supercharging may be a method for increasing power, in which the charge air used for the combustion process in the engine is compressed, as a result of which a greater mass of charge air can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is possible, given the same vehicle boundary conditions, to shift the load collective toward higher loads, at which the specific fuel consumption is lower. Supercharging of an internal combustion engine consequently assists in the efforts to minimize fuel consumption, that is to say to improve the efficiency of the internal combustion engine.

By means of a suitable transmission configuration, it is additionally possible to realize so-called downspeeding, whereby a lower specific fuel consumption is likewise achieved. In the case of downspeeding, use is made of the fact that the specific fuel consumption at low engine speeds is generally lower, in particular in the presence of relatively high loads.

With targeted configuration of the supercharging, it is also possible to obtain decreased exhaust-gas emissions. With suitable supercharging for example of a diesel engine, the nitrogen oxide emissions can therefore be reduced without any losses in efficiency. At the same time, the hydrocarbon emissions can be positively influenced. The emissions of carbon dioxide, which correlate directly with fuel consumption, likewise decrease with falling fuel consumption.

To adhere to future limit values for pollutant emissions, however, further measures are desired. Here, the focus of the development work is on inter alia the reduction of nitrogen oxide emissions, which are of high relevance in particular in diesel engines. Since the formation of nitrogen oxides occurs not only an excess of air but also high temperatures, one concept for lowering the nitrogen oxide emissions consists in using combustion processes with lower combustion temperatures.

Here, exhaust-gas recirculation (EGR), that is to say the recirculation of combustion gases from the outlet side to the inlet side of an engine, is expedient in achieving this aim, wherein it is possible for the nitrogen oxide emissions to be considerably reduced with increasing EGR rate. Here, the EGR rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air. The oxygen provided via exhaust-gas recirculation may possibly be taken into consideration.

To obtain a considerable reduction in nitrogen oxide emissions, high EGR rates may be desired, which may be of the order of magnitude of $x_{EGR}\approx60\%$ to 70% or more. Such high recirculation rates may demand cooling of the EGR, by which means the temperature of the exhaust gas is reduced and the density of the exhaust gas increased, so that a greater mass of exhaust gas can be recirculated. Consequently, an exhaust-gas recirculation arrangement is commonly equipped with a cooler. The exhaust-gas recirculation arrangement of the internal combustion engine to which the present disclosure relates also has a cooling arrangement, that is to say at least one EGR cooler, which has a coolant-conducting coolant jacket which serves for the transfer of heat between exhaust gas and coolant.

Problems can arise during the introduction of the recirculated exhaust gas into the intake system if the temperature of the recirculated hot exhaust gas decreases and condensate forms.

Firstly, condensate can form if the recirculated hot exhaust gas meets, and is mixed with, cool fresh air in the intake system. The EGR gas cools down, whereas the temperature of the fresh air is increased. The temperature of the mixture of fresh air and EGR, that is to say the temperature of the combustion air, lies below the temperature of the EGR. During the course of the cooling of the exhaust gas, liquids previously contained in the EGR and/or in the combustion air still in gaseous form, in particular water, may condense if the dew point temperature of a component of the gaseous combustion-air flow is undershot. Condensate formation occurs in the free combustion-air flow, wherein contaminants in the combustion air often form the starting point for the formation of condensate droplets.

Secondly, condensate can form when the EGR and/or the combustion air impinges on the internal wall of the intake system, as the wall temperature generally lies below the dew point temperature of the relevant gaseous components.

Condensate and condensate droplets are undesirable and may to increased noise emissions in the intake system and possibly to degradation of the impeller blades of a compressor impeller, which is arranged in the intake system, of a supercharger or of an exhaust-gas turbocharger. The latter effect is associated with a reduction in efficiency of the compressor.

With regard to the problem of the above-described condensate formation, too, an EGR cooler may be expedient or helpful. The cooling of the exhaust gas for recirculation during the course of the recirculation has the effect that the condensate does not form for the first time in the intake system but forms already during the recirculation, and can be separated off during the course of the recirculation.

A disadvantage of the EGR coolers according to previous attempts is that the useful exhaust-gas energy, that is to say the heat that can be extracted from the exhaust gas in the cooler by means of coolant, is out of principle only available and usable when exhaust gas is being recirculated. According to the previous examples, if the exhaust-gas recirculation arrangement has been deactivated, such that no exhaust gas is being recirculated, the exhaust-gas energy of the hot exhaust gas may be wasted. If it were possible to utilize said exhaust-gas energy, that is to say to recover said exhaust-gas energy in the context of energy recovery, it would be possible to achieve further efficiency advantages in the internal combustion engine.

The energy of the hot exhaust gas could for example be utilized to reduce the friction losses and thus the fuel consumption of the internal combustion engine. Here, rapid warming of the engine oil by means of exhaust-gas heat, in particular after a cold start, could be expedient. Fast warming of the engine oil during the warm-up phase of the internal combustion engine ensures a correspondingly fast decrease in the viscosity of the oil and thus a reduction in friction and friction losses, in particular in the bearings which are supplied with oil, for example the bearings of the crankshaft.

Here, the oil could for example be actively warmed by means of a heating device. For this purpose, it is possible in the warm-up phase for a coolant-operated oil cooler to be utilized, contrary to its intended purpose, for cooling the oil.

Fast warming of the engine oil in order to reduce friction losses may basically also be aided by means of fast heating of the internal combustion engine itself, which in turn is assisted, that is to say forced, by virtue of as little heat as possible being extracted from the internal combustion engine during the warm-up phase.

In this respect, in the case of a liquid-cooled internal combustion engine, it may also be expedient for heat to be supplied to the coolant of the engine cooling arrangement, in particular in the warm-up phase or after a cold start. It would be possible for the exhaust-gas energy to be utilized for warming the coolant of the engine cooling arrangement.

It is also a disadvantage of EGR coolers according to the previous attempts that the coolers may not be configured to perform energy recovery, with the focus rather being on the cooling of the exhaust gas, that is to say the pure cooling effect. Here, the cooler may be able to cope with all exhaust-gas flow rates for recirculation via the exhaust-gas recirculation arrangement during the operation of the internal combustion engine. In particular, the maximum exhaust-gas flow rate for recirculation and for cooling may be allowed for. The range of variation of the exhaust-gas flow rate for recirculation via the exhaust-gas recirculation arrangement leads to widely varying pressure conditions at the cooler. The pressure gradient across the cooler changes noticeably in a manner dependent on the exhaust-gas flow rate for recirculation, that is to say in such a relevant manner that it may be taken into consideration in the control or setting of the recirculation rate. The resulting interaction leads to certain dynamics, and necessitates correspondingly complex or intricate control of the exhaust-gas recirculation arrangement.

In one example, the issues described above may be addressed by a supercharged internal combustion engine having at least one cylinder, an intake system for supplying air to the at least one cylinder, an exhaust-gas discharge system for discharging the exhaust gases, and an exhaust-gas recirculation arrangement which comprises at least one recirculation line, with at least one cooler and at least one control element being provided in the at least one recirculation line for the purposes of setting a predefinable exhaust-gas flow rate for recirculation, the internal combustion engine further comprising at least two recirculation lines, in which there is arranged in each case one cooler, the coolers being arranged in parallel and being usable independently of one another for cooling exhaust gas for the purposes of energy recovery.

In the case of the internal combustion engine according to the disclosure, multiple coolers are provided by means of which exhaust gas for recirculation can be cooled. In some cases, the coolers can be activated, and used for the cooling of exhaust gas for recirculation, simultaneously. In this way, the cooling power of the EGR cooling arrangement, or the number of EGR coolers, can be adapted to the exhaust-gas flow rate for cooling. The benefits of which will be described in greater detail below.

The pressure gradient across a single cooler changes during the operation of the cooler to a lesser extent than in the previous examples, because the exhaust-gas flow rates to be cooled or coped with by said cooler vary to a lesser extent.

In the case of relatively low recirculation rates, it is possible according to the disclosure for one cooler to be used for cooling the exhaust gas for recirculation. If the exhaust-gas flow rate for recirculation and for cooling then increases, it is possible, for example in the event of an exceedance of a predefinable exhaust-gas flow rate, for a further cooler to be activated in order to cool exhaust gas and contribute to the cooling of the exhaust gas for recirculation. Depending on the number of EGR coolers provided, if for example three, four or more coolers are provided, activation can be performed several times or in succession. The control or adjustment of the recirculation rate reacts less dynamically.

Furthermore, the line system of the exhaust-gas-conducting lines may be configured or switchable in such a way that, even when the exhaust-gas recirculation arrangement has been deactivated, when no exhaust gas is being recirculated, one cooler is utilized and used for cooling exhaust gas, such that, by contrast to the previous examples, the energy inherent in the exhaust gas can be utilized, or made utilizable, in the context of energy recovery even when the exhaust-gas recirculation arrangement has been deactivated.

The exhaust-gas energy can be utilized for example in the warm-up phase or after a cold start for warming the engine oil of the internal combustion engine and thus reducing the friction losses of the internal combustion engine. In the case of a liquid-cooled internal combustion engine, the exhaust-gas energy can be utilized for warming the coolant of the engine cooling arrangement and thus accelerating the heating of the internal combustion engine. Both measures improve or increase the efficiency of the internal combustion engine.

The EGR coolers of the internal combustion engine according to the disclosure are configured both with regard to effective cooling and with regard to the energy recovery, that is to say the utilization of the exhaust-gas energy. According to the disclosure, both aspects are provided.

The internal combustion engine to which the present disclosure relates is a supercharged internal combustion engine. Reference is made to the benefits already mentioned, and the statements made, in conjunction with supercharging.

The internal combustion engine according to the disclosure thus may be a supercharged internal combustion engine where the exhaust-gas energy can be utilized more effectively than in the previous examples, and which is further improved with regard to the exhaust-gas recirculation.

According to the disclosure, the at least two recirculation lines belong to one exhaust-gas recirculation arrangement, that is to say to a single, or the same, exhaust-gas recirculation arrangement. An internal combustion engine which is equipped with a low-pressure EGR arrangement comprising a recirculation line and with a high-pressure EGR arrangement comprising a recirculation line has two recirculation lines, but not an exhaust-gas recirculation arrangement according to the disclosure.

Embodiments of the internal combustion engine are desired in which the coolers form an integral structural unit. A prefabricated assembly which comprises the coolers and which constitutes the entire cooling unit simplifies the installation of the exhaust-gas recirculation arrangement and of the internal combustion engine as a whole, and thus also reduces costs.

Embodiments of the internal combustion engine may also be desired in which the coolers are in the form of individual, separate coolers. In accordance with a modular principle, it is then possible using individual coolers to form different exhaust-gas recirculation arrangements or to equip different internal combustion engines.

Further alternative embodiments of the internal combustion engine according to the disclosure will be discussed herein.

Embodiments of the supercharged internal combustion engine may be desired may include one or more of a first recirculation line provided in which a first cooler is arranged and which, using at least one control element, is at least connectable upstream of the first cooler to the exhaust-gas discharge system and downstream of the first cooler to the intake system, a second recirculation line provided in which a second cooler is arranged and which, using at least one control element, is at least connectable upstream of the second cooler to the exhaust-gas discharge system and downstream of the second cooler selectively to the intake system or to the exhaust-gas discharge system, and each cooler has, for the purposes of energy recovery, at least one coolant-conducting coolant jacket which serves for the transfer of heat between the exhaust gas and the coolant.

It may be desired that no exhaust gas is recirculated after a cold start of the internal combustion engine, because, upon the introduction of the recirculated exhaust gas into the still-cold intake system, a particularly large amount of condensate may form. With the then deactivated exhaust-gas recirculation arrangement, it is the case in the previous examples that the exhaust-gas energy of the hot exhaust gas cannot be utilized, despite the fact that a demand for warming the engine oil and the internal combustion engine in targeted fashion exists specifically after a cold start of the internal combustion engine.

By contrast to this, in the case of the present embodiment, the exhaust-gas energy of the hot exhaust gas can be utilized even when the exhaust-gas recirculation arrangement has been deactivated; at least by means of the second cooler which is selectively connectable, downstream, to the intake system or to the exhaust-gas discharge system, with at least one control element serving for this purpose by means of which the exhaust-gas-conducting lines can be correspondingly switched, specifically connected to the exhaust-gas discharge system. It is thus possible even when the exhaust-gas recirculation arrangement has been deactivated for heat to be transferred from the exhaust gas to the coolant of the second cooler, wherein the coolant flowing or circulating through the second cooler discharges the heat from the interior of the second cooler and supplies it for a predefinable use, whereby the efficiency of the internal combustion engine is increased.

Embodiments of the supercharged internal combustion engine may include in which the first recirculation line is, downstream of the first cooler, at least connectable selectively to the intake system or to the exhaust-gas discharge system using at least one control element.

In the above embodiment, when the exhaust-gas recirculation arrangement has been deactivated, the exhaust-gas energy of the hot exhaust gas can be also be utilized by means of the first cooler, which in the present case is likewise selectively connectable, downstream, to the intake system or to the exhaust-gas discharge system, with at least one control element serving for this purpose by means of which the exhaust-gas-conducting lines can be correspondingly switched, specifically connected to the exhaust-gas discharge system.

Thus, when the exhaust-gas recirculation arrangement has been deactivated, it is possible for both coolers of the exhaust-gas recirculation arrangement to be utilized for energy recovery and for improving the efficiency of the internal combustion engine.

It is also possible for the first and/or second cooler to be permanently connected, upstream, to the exhaust-gas discharge system, wherein at least one control element provided downstream of the cooler is adjusted or switched such that the cooler is connected, downstream, to the intake system or to the exhaust-gas discharge system.

Embodiments of the supercharged internal combustion engine may further include in which the first recirculation line branches off from the exhaust-gas discharge system so as to form a first junction point and opens into the intake system so as to form a second junction point.

In this context, embodiments of the supercharged internal combustion engine may further include in which a first control element is provided in the first recirculation line at the second junction point.

The first control element functions as an EGR valve and, when the exhaust-gas recirculation arrangement is active, serves for the adjustment of the recirculation rate, or at least of the exhaust-gas flow rate recirculated via the first recirculation line. The use of a combination valve arranged at the second junction point permits dimensioning of the recirculated exhaust-gas flow rate and at the same time throttling of the intake fresh-air flow rate.

A combination valve of said type may for example be a flap which is pivotable about an axis running transversely with respect to the fresh-air flow, in such a way that, in a first end position, the front side of the flap blocks the intake system, and at the same time the recirculation line is opened up, and, in a second end position, the back side of the flap covers the recirculation line, and at the same time the intake system is opened up. An additional valve body which is connected and thereby mechanically coupled to the flap either opens up or blocks the recirculation line. Whereas the flap serves for the adjustment of the air flow rate supplied via the intake system, the valve body effects the metering of the recirculated exhaust-gas flow rate.

Embodiments of the supercharged internal combustion engine may further include in which the second recirculation line branches off from the exhaust-gas discharge system so as to form a third junction point and opens into the intake system so as to form a fourth junction point.

However, in the above-described context, in particular, embodiments of the supercharged internal combustion engine may further include in which the second recirculation line branches off from the exhaust-gas discharge system so as to form a third junction point and opens into the first recirculation line downstream of the first cooler so as to form a fourth junction point.

Then, when the exhaust-gas recirculation arrangement is active, a control element provided at the second junction point can serve for adjusting the entire recirculation rate, specifically both the exhaust-gas flow rate recirculated by the first recirculation line and the exhaust-gas flow rate recirculated by the second recirculation line.

Here, embodiments of the supercharged internal combustion engine may further include in which a second control element is provided in the second recirculation line downstream of the second cooler. Said second control element may be used for activating and deactivating the second cooler.

The second control element may however in some cases also be utilized for connecting the second cooler, downstream, to the exhaust-gas discharge system, for which purpose further exhaust-gas-conducting lines may be provided if desired. The second cooler then does not cool any exhaust gas for recirculation. Rather, the second cooler cools exhaust gas which has been extracted from the exhaust-gas discharge system and which is introduced into the exhaust-gas discharge system again. That is to say, in the present case, the second cooler serves only for energy recovery, that is to say for making the energy inherent in the exhaust gas utilizable.

For the reasons stated above, embodiments of the supercharged internal combustion engine may further include in which an exhaust-gas-conducting line is provided which branches off from the second recirculation line downstream of the second cooler so as to form a fifth junction point and opens into the exhaust-gas discharge system so as to form a sixth junction point.

Here, embodiments of the supercharged internal combustion engine may further include in which the second control element is arranged at the fifth junction point.

In embodiments in which the second recirculation line opens into the first recirculation line downstream of the first cooler so as to form a fourth junction point, it is then also possible for the first cooler to be connected, downstream, to the exhaust-gas discharge system via the further exhaust-gas-conducting line. Then, the first cooler does not cool any exhaust gas for recirculation, but rather cools exhaust gas that is introduced into the exhaust-gas discharge system again. Then, both coolers serve for energy recovery when the exhaust-gas recirculation arrangement has been deactivated.

In embodiments in which an exhaust-gas-conducting line branches off from the second recirculation line downstream of the second cooler and opens into the exhaust-gas discharge system so as to form a sixth junction point, it may be desired for the sixth junction point to be arranged in the exhaust-gas discharge system downstream of the first and third junction points.

In this context, embodiments of the supercharged internal combustion engine may further include in which a throttle element is arranged in the exhaust-gas discharge system upstream of the sixth junction point and downstream of the first and third junction points. The throttle element serves for increasing the exhaust-gas pressure upstream in the exhaust-gas discharge system, whereby the driving pressure gradients across the cooler are likewise increased and a path for the exhaust gas to circumvent the cooler is eliminated, or the bypassing of the cooler is impeded.

To generate the desired pressure gradient, it is additionally possible for a shut-off element to be provided upstream of the point at which the exhaust-gas recirculation arrangement opens into the intake system, in order, at the inlet side, to reduce the pressure upstream of the compressor.

Embodiments of the supercharged internal combustion engine may further include in which at least one compressor which can be driven by means of an auxiliary drive is arranged in the intake system.

A compressor that can be driven by means of an auxiliary drive, that is to say a supercharger, in relation to an exhaust-gas turbocharger consists in that the supercharger can generate, and may make available, the demanded charge pressure through a plurality of conditions, specifically regardless of the operating state of the internal combustion engine. This applies in particular to a supercharger which can be driven electrically by means of an electric machine, and is therefore independent of the rotational speed of the crankshaft.

In the previous examples, it is specifically the case that difficulties are encountered in achieving an increase in power in all engine speed ranges by means of exhaust-gas turbocharging. A relatively severe torque drop is observed in the event of a certain engine speed being undershot. Said torque drop is understandable if one takes into consideration that the charge pressure ratio is dependent on the turbine pressure ratio or the turbine power. If the engine speed is reduced, this leads to a smaller exhaust-gas mass flow and therefore to a lower turbine pressure ratio or a lower turbine power. Consequently, toward lower engine speeds, the charge pressure ratio likewise decreases. This equates to a torque drop.

Embodiments of the supercharged internal combustion engine may nevertheless may further include in which at least one exhaust-gas turbocharger is provided, which comprises a turbine arranged in the exhaust-gas discharge system and a compressor arranged in the intake system. In an exhaust-gas turbocharger, a compressor and a turbine are arranged on the same shaft. The hot exhaust-gas flow is fed to the turbine and expands in the turbine with a release of energy, as a result of which the shaft is set in rotation. The energy supplied by the exhaust-gas flow to the shaft is used for driving the compressor which is likewise arranged on the shaft. The compressor conveys and compresses the charge air fed to it, as a result of which supercharging of the cylinders is obtained. A charge-air cooler is advantageously provided in the intake system downstream of the compressor, by means of which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. In effect, compression by cooling is obtained.

An exhaust-gas turbocharger in relation to a supercharger—which can be driven by means of an auxiliary drive—consists in that an exhaust-gas turbocharger utilizes the exhaust-gas energy of the hot exhaust gases, whereas a supercharger draws the energy needed for driving it directly or indirectly from the internal combustion engine and thus adversely affects, that is to say reduces, the efficiency, at least for as long as the drive energy does not originate from an energy recovery source.

If the supercharger is not one that can be driven by means of an electric machine, that is to say electrically, a mechanical or kinematic connection for power transmission is generally needed between the supercharger and the internal combustion engine, which also adversely affects or determines the packaging in the engine bay.

To be able to counteract a torque drop at low engine speeds, embodiments of the internal combustion engine are particularly advantageous in which at least two exhaust-gas turbochargers are provided. Specifically, if the engine speed is reduced, this leads to a smaller exhaust-gas mass flow and therefore to a lower charge-pressure ratio.

Through the use of multiple exhaust-gas turbochargers, for example multiple exhaust-gas turbochargers connected in series or parallel, the torque characteristic of a supercharged internal combustion engine can be noticeably improved.

In order to improve the torque characteristic, it is possible, in addition to the at least one exhaust-gas turbocharger, for a further compressor to also be provided, specifically either a supercharger that can be driven by means of an auxiliary drive or a compressor of a further exhaust-gas turbocharger.

In this context, embodiments of the supercharged internal combustion engine may further include in which the recirculation lines open into the intake system downstream of the compressor.

In the case of a so-called high-pressure EGR arrangement, the exhaust gas is introduced into the intake system downstream of the compressor. Here, to provide or ensure the pressure gradient, needed for a recirculation, between the exhaust-gas discharge system and the intake system, in the case of an exhaust-gas turbocharging arrangement the exhaust gas is preferably, and commonly, extracted from the exhaust-gas discharge system upstream of the associated turbine. High-pressure EGR may not pass the compressor, and therefore does not have to be subjected to exhaust-gas aftertreatment, for example in a particle filter, before the recirculation. There is no risk of deposits in the compressor which change the geometry of the compressor, in particular the flow cross sections, and thereby impair the efficiency of the compressor. Condensate formation occurs—if at all—downstream of the compressor, which also, during the course of the compression, heats the charge air that is supplied to it, and thereby prevents or counteracts condensate formation.

Embodiments of the supercharged internal combustion engine may further include in which the recirculation lines open into the intake system upstream of the compressor.

During the operation of an internal combustion engine with exhaust-gas turbocharging and the simultaneous use of a high-pressure EGR arrangement, a conflict may arise when the recirculated exhaust gas is extracted from the exhaust-gas discharge system upstream of the turbine and is no longer available for driving the turbine.

In the event of an increase in the exhaust-gas recirculation rate, the exhaust-gas flow introduced into the turbine simultaneously decreases. The reduced exhaust-gas mass flow through the turbine leads to a lower turbine pressure ratio, as a result of which the charge pressure ratio also falls, which equates to a smaller compressor mass flow. Aside from the decreasing charge pressure, problems may additionally arise in the operation of the compressor with regard to the surge limit. Pollutant emissions may increase, for example with regard to the formation of soot during an acceleration in the case of diesel engines.

For this reason, adequately high charge pressures with simultaneously high exhaust-gas recirculation rates are desired. One approach to a solution is so-called low-pressure EGR, by means of which exhaust gas that has already flowed through the turbine is recirculated into the intake system. For this purpose, the low-pressure EGR arrangement extracts exhaust gas from the exhaust-gas discharge system downstream of the turbine and conducts said exhaust gas into the intake system preferably upstream of the compressor, in order to be able to realize the pressure gradient, desired for a recirculation, between the exhaust-gas discharge system and the intake system.

The exhaust gas which is recirculated via the low-pressure EGR arrangement is mixed with fresh air upstream of the compressor. The mixture of fresh air and recirculated exhaust gas produced in this way forms the charge air which is supplied to the compressor and compressed, wherein the compressed charge air is cooled, downstream of the compressor, in a charge-air cooler.

Since exhaust gas is conducted through the compressor, the exhaust gas is preferably subjected to exhaust-gas aftertreatment downstream of the turbine. The low-pressure EGR arrangement may also be combined with a high-pressure EGR arrangement. In one example, the exhaust-gas aftertreatment may include a particulate filter so that particulates in the low-pressure EGR do not impinge onto surfaces of the compressor.

For the reasons already stated, embodiments of the supercharged internal combustion engine may further include in which the recirculation lines branch off from the exhaust-gas discharge system upstream of the turbine.

Embodiments of the supercharged internal combustion engine may further include in which the turbine of an exhaust-gas turbocharger that is provided has a variable turbine geometry, which permits an extensive adaptation to the operation of the internal combustion engine through adjustment of the turbine geometry or of the effective turbine cross section. Here, adjustable guide blades for influencing the flow direction are arranged in the inlet region of the turbine. By contrast to the impeller blades of the rotating impeller, the guide blades do not rotate with the shaft of the turbine.

If the turbine has a fixed, invariable geometry, the guide blades are arranged in the inlet region so as to be not only stationary but rather also completely immovable, that is to say rigidly fixed, if a guide device is provided at all. By contrast, in the case of a variable geometry, the guide blades are duly arranged so as to be stationary but not so as to be completely immovable, rather so as to be rotatable about their axis, such that the flow approaching the impeller blades can be influenced.

Through adjustment of the turbine geometry, it is possible for the exhaust-gas pressure upstream of the turbine to be influenced, and thus for the pressure gradient between the exhaust-gas discharge system and intake system, and thus the recirculation rate of the high-pressure EGR arrangement, to be influenced.

For reasons already stated, embodiments of the supercharged internal combustion engine may further include in which the recirculation lines branch off from the exhaust-gas discharge system downstream of the turbine.

In this context, embodiments of the supercharged internal combustion engine may further include in which at least one exhaust-gas aftertreatment system is provided in the exhaust-gas discharge system between the turbine and the branching-off recirculation lines. Since exhaust gas is conducted through the compressor, the exhaust gas may be subjected to exhaust-gas aftertreatment downstream of the turbine.

Here, embodiments of the supercharged internal combustion engine are advantageous in which a particle filter is provided as exhaust-gas aftertreatment system for the aftertreatment of the exhaust gas.

To minimize the soot emissions, use is in this case made of a regenerative particle filter which filters the soot particles out of the exhaust gas and stores them, with said soot particles being burned off intermittently during the course of the regeneration of the filter. The regeneration temperatures of the particle filter are approximately 550° C. in the absence of catalytic assistance. Therefore, additional measures are generally implemented in order to ensure a regeneration of the filter under all operating conditions.

The regeneration of the filter introduces heat into the exhaust gas and increases the exhaust-gas temperature and thus the exhaust-gas enthalpy. A more energy-rich exhaust gas is thus available at the outlet of the filter, which exhaust gas can be utilized in the manner according to the disclosure.

Embodiments of the supercharged internal combustion engine may further include in which an oxidation catalytic converter is provided as exhaust-gas aftertreatment system for the aftertreatment of the exhaust gas.

Even without additional measures, oxidation of the unburned hydrocarbons and of carbon monoxide duly takes place in the exhaust-gas discharge system at a sufficiently high temperature level and in the presence of sufficiently large oxygen quantities. However, on account of the exhaust-gas temperature which falls quickly in the downstream direction, and the consequently rapidly decreasing rate of reaction, said reactions are quickly halted. Therefore, use is made of catalytic reactors which, using catalytic materials, ensure an oxidation even at low temperatures. If nitrogen oxides are additionally to be reduced, this may, in the case of the Otto-cycle engine, be achieved through the use of a three-way catalytic converter.

The oxidation is an exothermic reaction, wherein the heat that is released increases the temperature and thus the enthalpy of the exhaust gas. A more energy-rich exhaust gas is thus available at the outlet of the oxidation catalytic converter. In this respect, the provision of an oxidation catalytic converter may utilize of the exhaust-gas energy according to the disclosure.

Embodiments of the supercharged internal combustion engine may further include in which a bypass line for circumventing the cooler is provided, which bypass line bypasses the EGR cooler and by means of which bypass line the exhaust gas that is recirculated via the exhaust-gas recirculation arrangement can be introduced, circumventing the cooler, into the intake system.

It may be expedient to bypass the EGR cooling arrangement for example in order to prevent heat from additionally being introduced into the liquid-type cooling arrangement of the internal combustion engine. Such an approach is expedient if the liquid-type cooling arrangement of the internal combustion engine is already highly loaded, for example in full-load situations. If the exhaust-gas recirculation arrangement is utilized during the course of engine braking, it is likewise expedient for the hot exhaust gas to be recirculated without being cooled.

Embodiments of the supercharged internal combustion engine may further include in which a liquid-type cooling arrangement is provided for forming an engine cooling arrangement.

Here, embodiments of the supercharged internal combustion engine may further include in which the at least one cylinder head of the internal combustion engine is provided with at least one coolant jacket, which is integrated in the cylinder head, in order to form a liquid-type cooling arrangement.

A liquid-type cooling arrangement may decrease the thermal loading of supercharged engines more than that of conventional internal combustion engines. If the cylinder head has an integrated exhaust manifold, said cylinder head is thermally more highly loaded than a conventional cylinder head which is equipped with an external manifold. Increased demands may be placed on the cooling arrangement.

In this context, embodiments of the supercharged internal combustion engine may further include in which the liquid-type cooling arrangement has a cooling circuit which comprises the coolers of the exhaust-gas recirculation arrangement.

If the EGR coolers are incorporated into the cooling circuit of the engine cooling arrangement, numerous components and assemblies needed to form a circuit basically need to be provided only singularly, as these may be used both for the cooling circuit of the EGR cooler and also for that of the engine cooling arrangement, which leads to synergies and cost savings, but also entails a weight saving.

For example, only one pump for conveying the coolant, and one container for storing the coolant may be provided. The heat dissipated to the coolant from the internal combustion engine and from the EGR cooling arrangement can be extracted from the coolant in a common heat exchanger (e.g., a radiator different than the EGR cooling arrangement).

The exhaust-gas energy or exhaust-gas heat that is absorbed by the coolant in the EGR cooling arrangement can thus likewise be utilized more easily, for example for warming the internal combustion engine or the engine oil.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
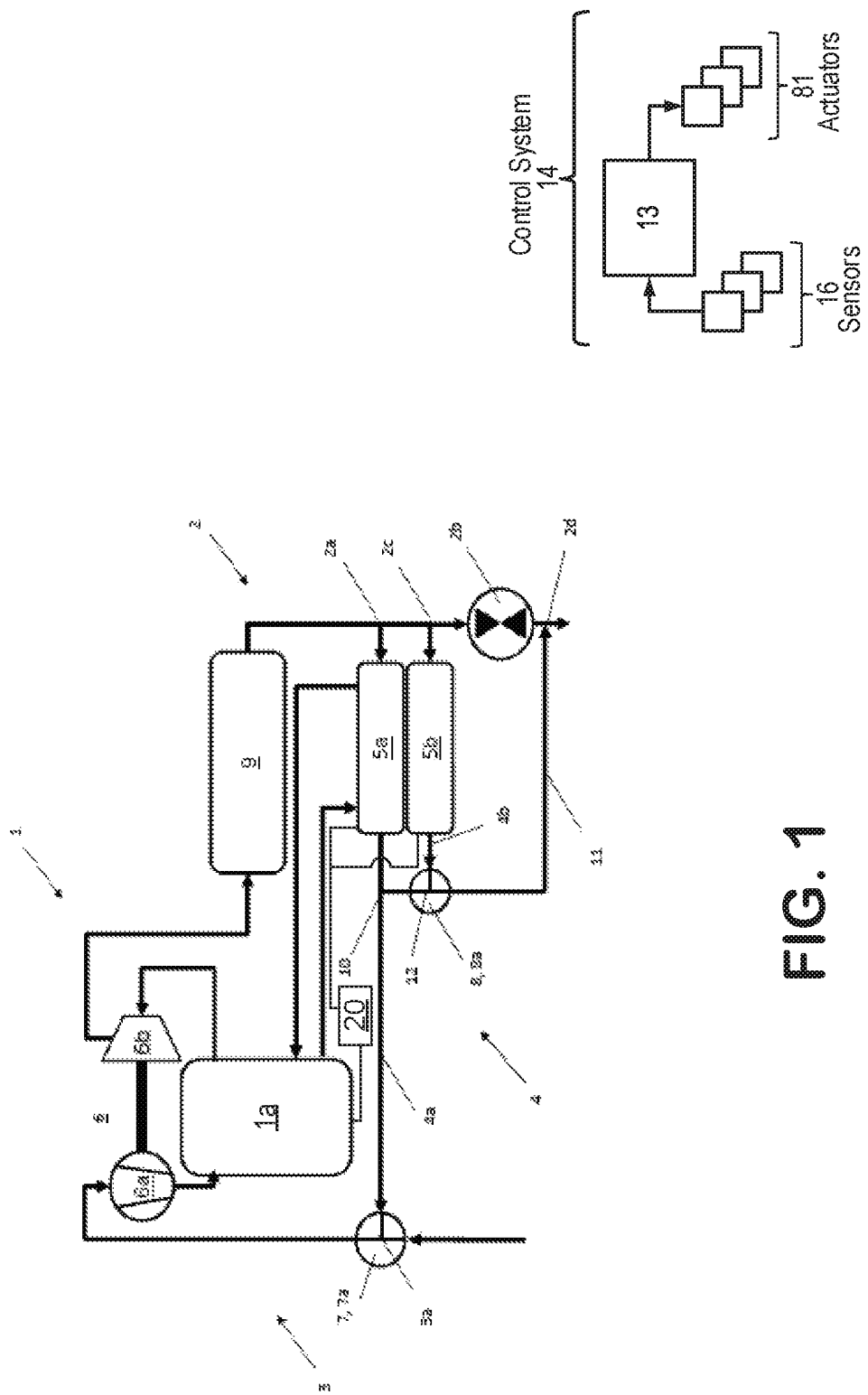
FIG. 1 schematically shows a first embodiment of the supercharged internal combustion engine together with exhaust-gas recirculation arrangement.

The following description relates to systems and methods for a cooling arrangement arranged configured to cool EGR and perform energy recovery. The cooling arrangement may be arranged in an exhaust system of an engine, as shown in FIG. 1. The cooling arrangement may comprise two or more coolers arranged in a shared housing of the arrangement, each of the coolers having an inlet and an outlet independent of the other cooler. One or more valves may be located upstream and downstream of the cooling arrangement as shown in FIG. 1.

FIGS. 2, 3, 4, and 5 show exhaust gas flow through the engine system in response to actuation of one or more of the valves associated with the cooling arrangement. A method for selecting which of the modes associated with FIGS. 2-5 to operate the cooling system in based on engine operating conditions is shown in FIG. 6.

Turning now to FIG. 1, it schematically shows a first embodiment of the supercharged internal combustion engine 1 together with exhaust-gas recirculation arrangement 4.

The internal combustion engine 1 has an intake system 3 for supplying charge air to the cylinders and has an exhaust-gas discharge system 2 for discharging the exhaust gases from the cylinders.

For the purposes of supercharging, the internal combustion engine 1 is equipped with an exhaust-gas turbocharger 6 which comprises a turbine 6b arranged in the exhaust-gas discharge system 2 and a compressor 6a arranged in the intake system 3.

Furthermore, an exhaust-gas recirculation (EGR) arrangement 4 is provided which has two recirculation lines 4a, 4b, wherein coolers 5a, 5b are arranged in each recirculation line 4a, 4b, respectively. The coolers 5a, 5b have in each case one coolant-conducting coolant jacket which serves for the transfer of heat between the exhaust gas and the coolant. The coolers 5a, 5b are arranged in parallel and are mutually independently usable for the cooling of exhaust gas or for energy recovery and fluidly connected or connectable to the engine cooling arrangement. As such, herein, the EGR arrangement 4 may be interchangeably referred to as the cooling arrangement 4. Specifically, a coolant system 20 is shown fluidly coupled to each of the coolers 5a, 5b. Additionally, the coolant system 20 is shown coupled to the engine 1a. It will be appreciated that in some embodiments, the coolant system 20 is separated from a coolant system of the engine 1a without departing from the scope of the present disclosure.

The first recirculation line 4a branches off from the exhaust-gas discharge system 2 downstream of the turbine 6b so as to form a first junction point 2a, and opens into the intake system 3 upstream of the compressor 6a so as to form a second junction point 3a. A first control element 7 is provided at the second junction point 3a. A combination valve 7a is used as first control element 7, which combination valve serves for the adjustment of the recirculated exhaust-gas flow rate, that is to say of the recirculation rate, and thus also for at least partial deactivation of the cooling arrangement 4.

The second recirculation line 4b likewise branches off from the exhaust-gas discharge system 2 downstream of the turbine 6b and downstream of the first junction point 2a so as to form a third junction point 2c and opens into the first recirculation line 4a downstream of the first cooler 5a so as to form a fourth junction point 10.

A further exhaust-gas-conducting line 11 is provided which branches off from the second recirculation line 4b downstream of the second cooler 5b so as to form a fifth junction point 12 and opens into the exhaust-gas discharge system 2 so as to form a sixth junction point 2d.

In the present case, the sixth junction point 2d is arranged in the exhaust-gas discharge system 2 downstream of the first and third junction points 2a, 2c, respectively. A throttle element 2b is arranged in the exhaust-gas discharge system 2 upstream of the sixth junction point 2d and downstream of the first and third junction points 2a, 2c. The throttle element 2b serves for increasing the exhaust-gas pressure upstream in the exhaust-gas discharge system 2, whereby the driving pressure gradients across the coolers 5a, 5b likewise increase.

A second control element 8 is provided in the second recirculation line 4b downstream of the second cooler 5b, which second control element is arranged at the fifth junction point 12. The second control element 8 is a 3/3-way valve 8a which has three line connectors and three switching positions and which connects the two coolers 5a, 5b via the second junction point 3a to the intake system 3 or via the sixth junction point 2d to the exhaust-gas discharge system 2, or else deactivates the second cooler 5b, that is to say separates said second cooler from the first recirculation line 4a and connects said second cooler to the exhaust-gas discharge system 2 via the sixth junction point 2d.

Both coolers 5a, 5b can thus be used for cooling EGR but also for energy recovery when one or more of EGR cooling is not desired and a current EGR cooling is not sufficient to meet a current energy recovery demand. This will be discussed in more detail below on the basis of FIGS. 2 to 5.

The supercharged internal combustion engine 1 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust flow rate sensor configured to measure a flow rate of exhaust gas through the exhaust system 2, exhaust gas sensor (located in an exhaust manifold of exhaust system 2), a temperature sensor, a pressure sensor (optionally located downstream of exhaust-gas aftertreatment system 9), and PM sensor. Other sensors such as additional pressure, temperature, air/fuel ratio, exhaust flow rate and composition sensors may be coupled to various locations in the supercharged internal combustion engine 1. As another example, the actuators may include fuel injectors, throttle, DPF valves that control filter regeneration, switch of electric circuit, etc. The control system 14 may include a controller 13. The controller 13 may be configured with computer readable instructions stored on non-transitory memory. The controller 13 receives signals from the various sensors of FIG. 1, processes the signals, and employs the various actuators of FIG. 1 to adjust engine operation based on the received signals and instructions stored on a memory of the controller.

Figure 2:
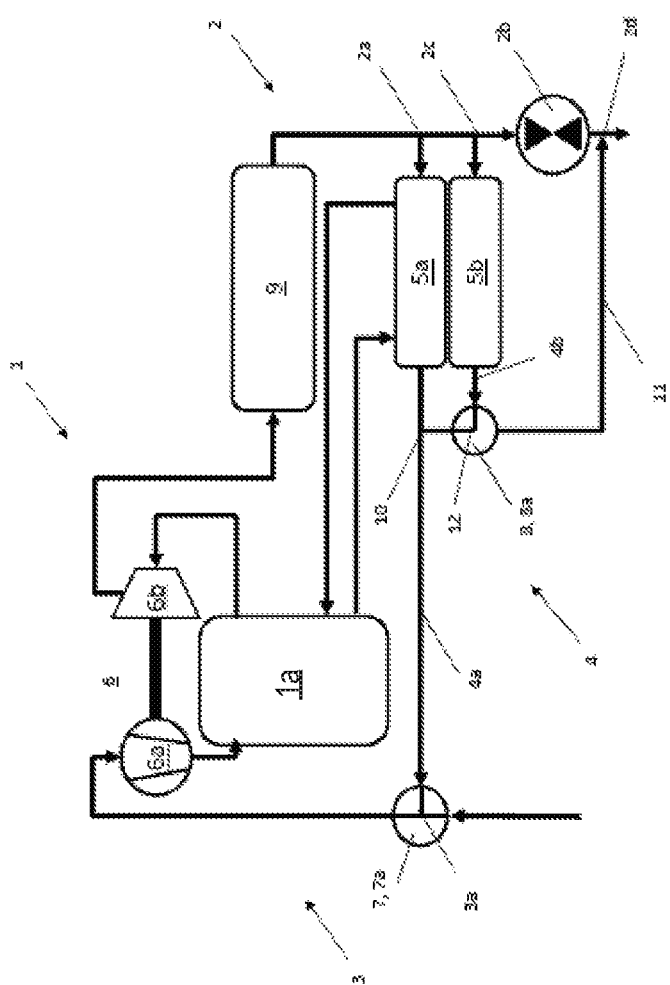
FIG. 2 schematically shows the first embodiment of the supercharged internal combustion engine together with exhaust-gas recirculation arrangement in a first operating mode.

FIG. 2 schematically shows the first embodiment of the supercharged internal combustion engine 1 together with exhaust-gas recirculation arrangement 4 in a first operating mode. It is sought merely to explain the additional features in relation to FIG. 1, for which reason reference is made otherwise to FIG. 1. Thus, components previously introduced may be similarly numbered in subsequent figures.

In the description herein, EGR refers to exhaust gas for recirculation. As such, EGR flows from one or more of the coolers 5a, 5b to the intake system 3. Alternatively, exhaust gas for energy recovery does not flow to the intake system 3. The exhaust gas is returned to the exhaust system 2 from one or more of the cooler 5a, 5b.

In the first operating mode, both coolers 5a, 5b may cool EGR. In the embodiment of FIG. 2, both coolers are shown cooling EGR. The second recirculation line 4b is connected to the first recirculation line 4a, and the first recirculation line 4a is connected to the intake system 3. The first and second control elements 7, 8 are switched or set correspondingly.

Said another way, in the first mode, cooled EGR is desired by the engine 1a. In the current example, an EGR flow rate desired may be greater than a capacity of a single cooler (e.g., cooler 5a or cooler 5b). As such, EGR flows to both the coolers 5a, 5b. The control element 7a may be adjusted to a position such that gas in the first recirculation line 4a may flow through the second junction 3a and into the intake system. The control element 8a may be adjusted to a position such that cooler EGR from the cooler 5b flows through the second recirculation line 4b, through the fifth junction 12, through the fourth junction 10, and into the first recirculation line 4a. Thus, cooled EGR from the cooler 5b may mix and/or merge with cooler EGR from the cooler 5a in the first recirculation line 4a. Herein, the cooler 5a may be referred to as first cooler 5a and the cooler 5b may be referred to as second cooler 5b.

Figure 3:
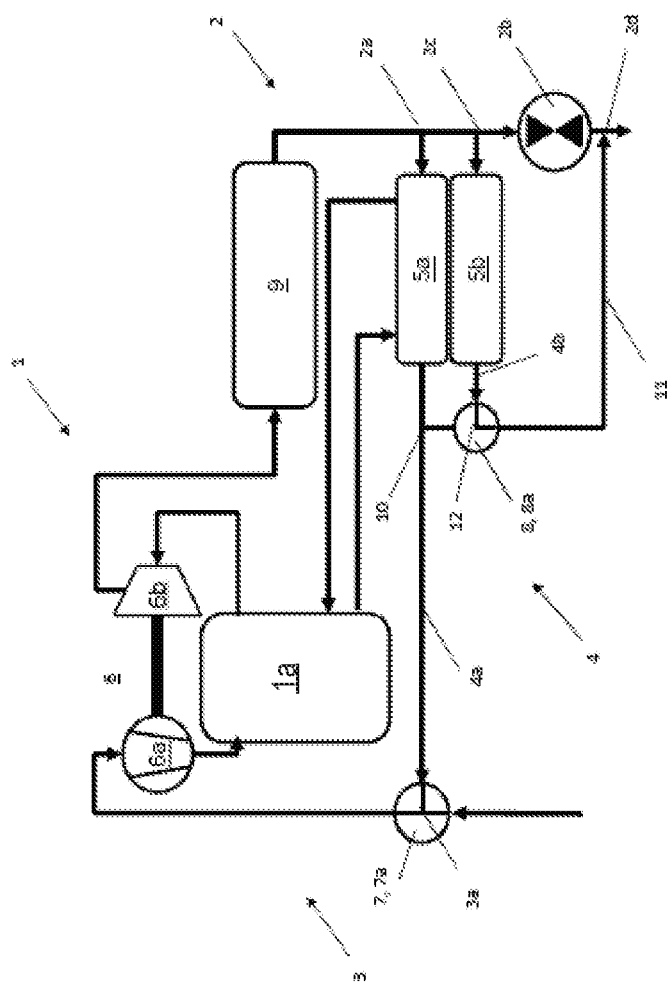
FIG. 3 schematically shows the first embodiment of the supercharged internal combustion engine together with exhaust-gas recirculation arrangement in a second operating mode.

FIG. 3 schematically shows the first embodiment of the supercharged internal combustion engine 1 together with exhaust-gas recirculation arrangement 4 in a second operating mode. It is sought merely to explain the additional features in relation to FIG. 1, for which reason reference is made otherwise to FIG. 1.

In the second operating mode, only the first cooler 5a may cool EGR, for which purpose the first recirculation line 4a is connected to the intake system 3 via the second junction point 3a. The second recirculation line 4b together with the second cooler 5b is separated from the first recirculation line 4a and is connected to the exhaust-gas discharge system 2 via the sixth junction point 2d. The second cooler 5b thus serves for energy recovery. The first and second control elements 7, 8 are switched or set correspondingly.

Said another way, in the second operating mode, the first cooler 5a may be configured to cool EGR and the second cooler 5b may be configured to cool exhaust gas for heat recovery. As such, the second control element 8 may be switched to a position fluidly sealing the second recirculation line 4b from the first recirculation line 4a. As such, gases from the first cooler 5a and the second cooler 5b may not mix during the second mode.

EGR from the first cooler 5a flows through the fourth junction 10, through the first recirculation line 4a, through the second junction 3a, and into the intake system 3. Thus, the first control element 7 is in a position configured to allow gases from the first recirculation line 4a to flow into the intake system 3.

Exhaust gas for heat recovery from the second cooler 5b flows through the fifth junction 12, through the exhaust-gas-conducting-line 11, and into the sixth junction point 2d of the exhaust system 2. Thus, the second control element 8 may be in a position configured to allow gases from the second recirculation line to flow back to the exhaust system 2. Additionally, in one example, the second mode does not allow gases from the first cooler 5a to mix with gases from the second cooler 5b. In this way, the second mode provides cooled EGR to the intake system via the first cooler 5a, and energy recovery via at least the second cooler 5b. It will be appreciated that coolant from the first cooler 5a, which has cooled EGR, may also be used for energy recovery purposes. As such, the first cooler 5a and the second cooler 5b may be used to meet an energy recovery demand during the second mode.

Figure 4:
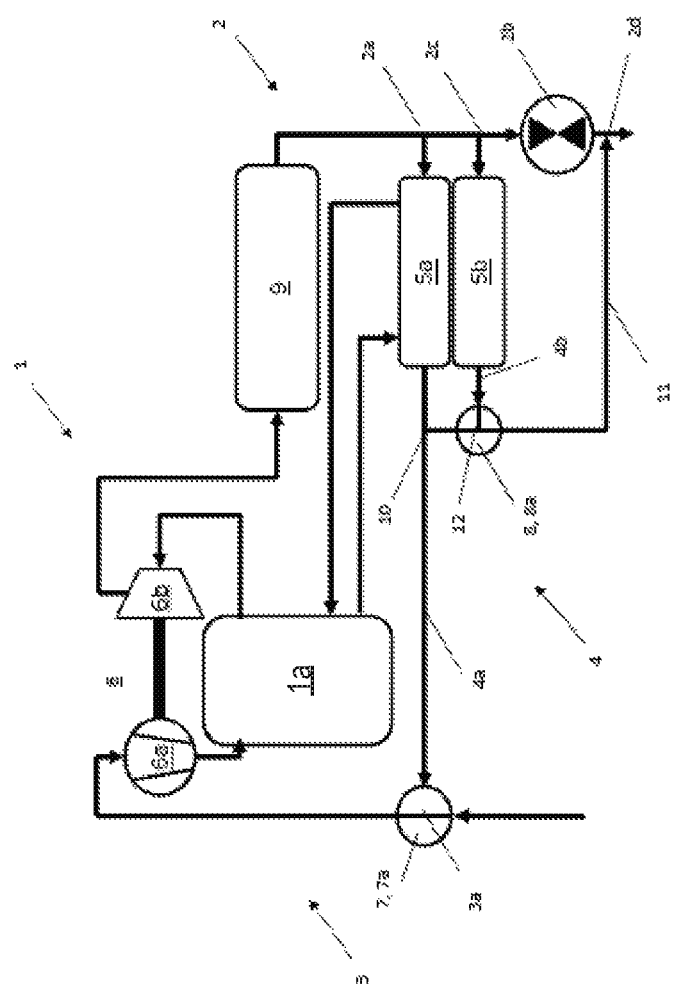
FIG. 4 schematically shows the first embodiment of the supercharged internal combustion engine together with exhaust-gas recirculation arrangement in a third operating mode.

FIG. 4 schematically shows the first embodiment of the supercharged internal combustion engine 1 together with exhaust-gas recirculation arrangement 4 in a third operating mode. It is sought merely to explain the additional features in relation to FIG. 1, for which reason reference is made otherwise to FIG. 1.

In the third operating mode, cooled EGR is not desired, and both coolers 5a, 5b of the cooling arrangement 4 are used for energy recovery. The first and second control elements 7, 8 are switched or set correspondingly. Both coolers 5a, 5b are connected to the exhaust-gas discharge system 2 via the sixth junction point 2d and separated from the intake system 3.

Said another way, the third mode corresponds to conditions where the engine 1a does not desire EGR cooling but does desired exhaust gas heat recovery. In one example, this may occur following a cold-start, wherein the engine temperature is greater than an ambient temperature, but a transmission temperature is less than a desired temperature and/or a cabin heating request is still unmet. As such, EGR cooling may not be desired, but exhaust gas heat recovery may be desired.

Thus, the cooling arrangement 4 is deactivated with regards to cooling EGR. However, the cooling arrangement 4 is still active in terms of cooling exhaust gas, specifically, exhaust gas for heat recovery. As such, the first control element 7 is moved to a position where gases from the first recirculation line 4a are prohibited from flowing to the intake system 3. Furthermore, the second control element 8 is adjusted to a position where gases from the first recirculation line 4a and the second recirculation line 4b may flow into the exhaust-gas-conducting line 11. The exhaust gases from the first cooler 5a and the second cooler 5b may mix in the exhaust-gas-conducting line 11 before flowing to the sixth junction 2d of the exhaust system 2. It will be appreciated by those of ordinary skill in the art that EGR may flow to the intake system 3 during the third operating mode, however, the EGR is not cooled by the cooling arrangement 4.

The embodiment of FIG. 4 shows both the first cooler 5a and the second cooler 5b being used to meet an energy recovery demand. However, it will be appreciated by those of ordinary skill in the art that only one cooler of the coolers 5a, 5b may be used during the third operating mode if a single cooler may meet the energy recovery demand. As such, either the first cooler 5a or the second cooler 5b may be activated during the third mode.

For example, if the energy recovery demand is less than or equal to a threshold energy recovery demand, the threshold energy recovery demand corresponding to a maximum amount of energy recovery a single cooler is configured to perform, then the third mode may comprise flowing exhaust gas for heat recovery to only one cooler of the coolers 5a, 5b. As an example, if only the second cooler 5b is used, then the first control element 7 is adjusted to a position to fluidly seal the first recirculation line from the intake system 3. Additionally, the second control element 8 is adjusted to a position to fluidly seal the first recirculation line 4a from the exhaust-gas-conducting line 11. Furthermore, the second control element 8 is adjusted to a position to fluidly couple the second recirculation line 4b to the exhaust-gas-conducting line 11. Additionally or alternatively, coolant may only flow to the second cooler 5b. As such, even if exhaust gas flows to the first cooler 5a, it does not communicate with any coolant flowing to the cooling arrangement 4.

Figure 5:
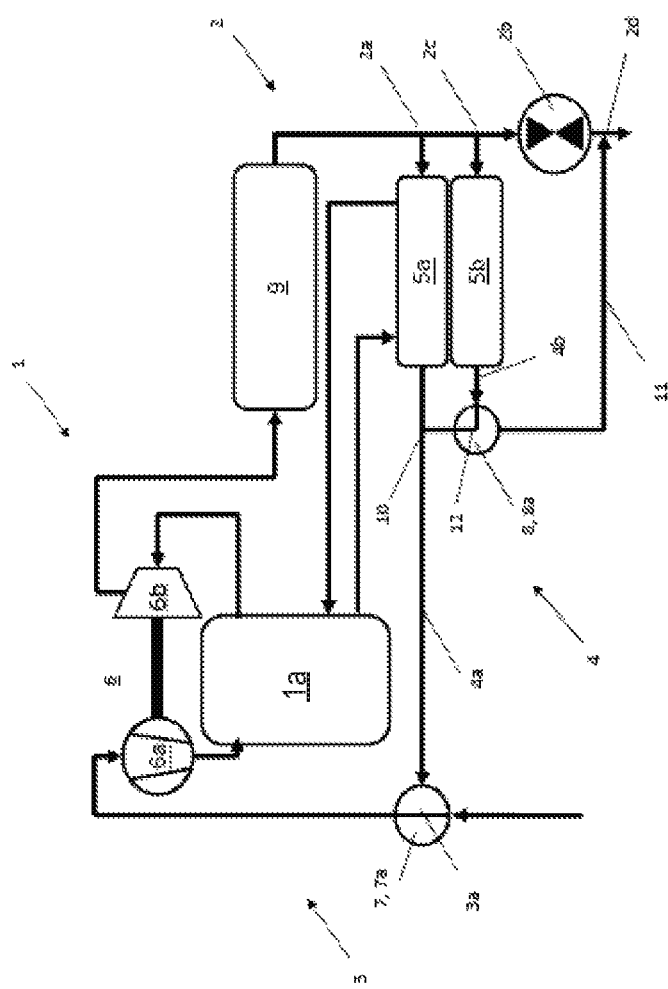
FIG. 5 schematically shows the first embodiment of the supercharged internal combustion engine together with exhaust-gas recirculation arrangement in a fourth operating mode.
Figure 6:
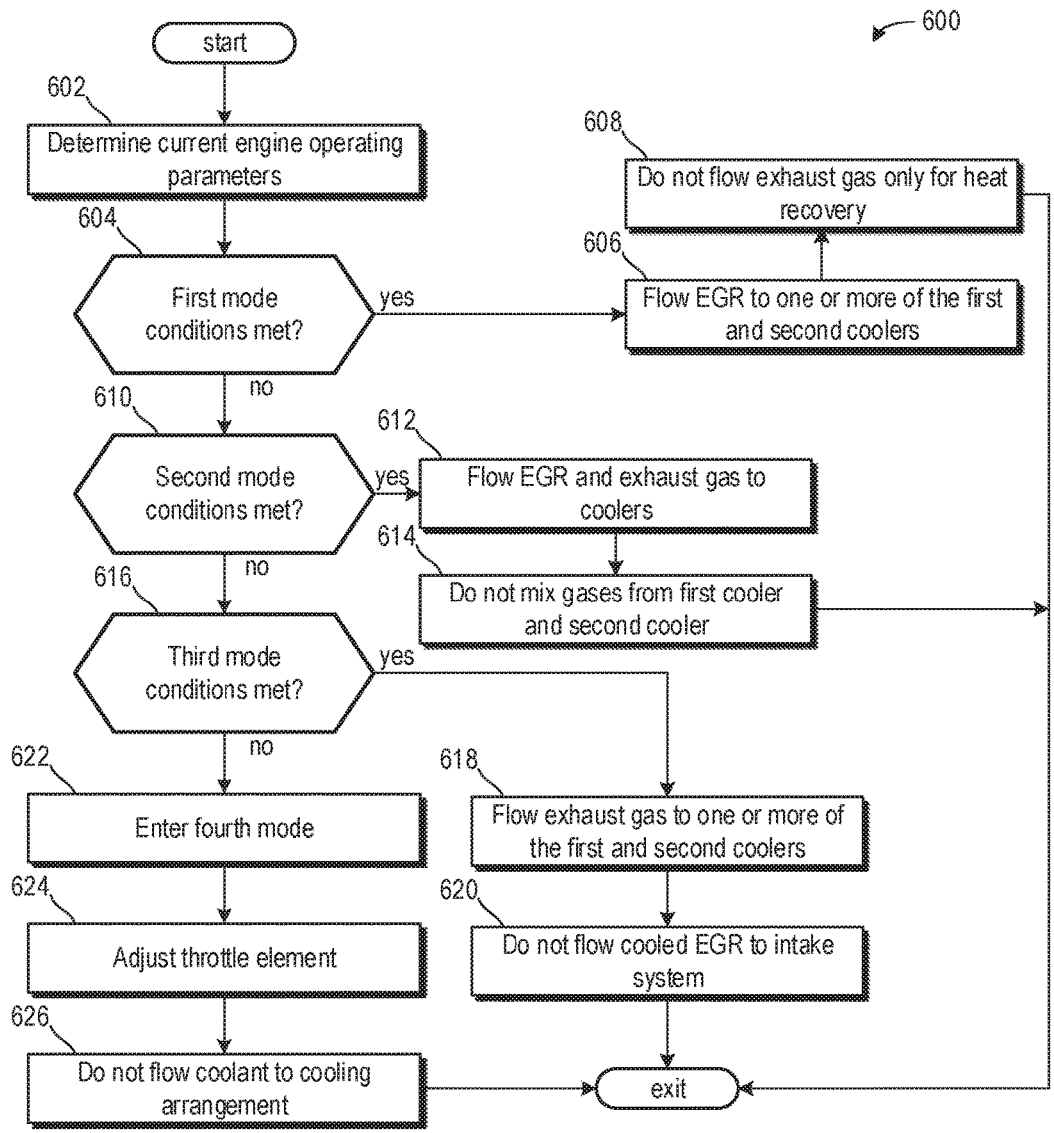
FIG. 6 shows a method for selecting which of the operating modes in which to operate the exhaust-gas recirculation arrangement.

FIG. 5 schematically shows the first embodiment of the supercharged internal combustion engine 1 together with exhaust-gas recirculation arrangement 4 in a fourth operating mode. It is sought merely to explain the additional features in relation to FIG. 1, for which reason reference is made otherwise to FIG. 1.

Both coolers 5a, 5b have been deactivated, both with regard to cooling of exhaust gas for recirculation and with regard to energy recovery. The cooling arrangement 4 and the energy recovery have been deactivated. In one example, coolant does not flow to both the first cooler 5a and the second cooler 5b. The first and second control elements 7, 8 are switched or set correspondingly.

Said another way, the fourth mode may correspond to conditions of the engine 1a wherein EGR cooling is not desired and heat recovery is not desired. As an example, this may occur during a mid-load where cabin heating is not desired and the engine and transmission are operating within desired operating ranges.

In one example, the first recirculation line 4a is fluidly sealed from the intake system 3 and the second recirculation line 4b is fluidly sealed from the exhaust-gas-conducting line 11 via the first control element 7 and second control element 8, respectively. As such, exhaust gas remains in the exhaust system 2 and is not cooled during the fourth mode.

Turning now to FIG. 6, it shows a method for determining which of the first, second, third, or fourth modes to operate the cooling arrangement 4. Instructions for carrying out method 600 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 600 may be described in reference to components previously described with respect to FIGS. 1-5. Specifically, the method 600 may include the first control element 7, the second control element 8, the first recirculation passage 4a, the second recirculation passage 4b, the exhaust-gas-conducting line 11, the exhaust system 2, the intake system 3, the engine 1a, and the controller 13.

In one example, the method may include determining first mode conditions being met, and in response thereto performing EGR cooling; and determining second mode conditions being met (where the second mode is not the same as the first mode), and in response thereto performing EGR cooling and exhaust gas energy recovery. Additionally or alternatively, the method may further include determining if third mode conditions are met, and in response thereto performing exhaust gas energy recovery without EGR cooling. If none of the first, second, and third mode conditions are met, then the method may include determining that fourth mode conditions are met, and in response thereto performing neither EGR cooling or exhaust gas heat recovery. As an example, first, second, and third mode conditions may be determined based on feedback from the engine temperature sensor, a transmission temperature sensor, and the exhaust gas sensor.

The method 600 begins at 602, where the method includes determining, estimating, and/or measuring current engine operating parameters. Current engine operating parameters may include but are not limited to one or more engine temperature, engine load, manifold vacuum, EGR flow rate, exhaust back pressure, transmission temperature, cabin heating demand, and air/fuel ratio.

The method 600 may proceed to 604, where the method may include determining if first mode conditions. As described above, the first operating mode may include flowing only EGR through the coolers of the cooling arrangement. As such, the first mode conditions may include one or more of an EGR cooling demand being greater than threshold EGR cooling demand and the EGR cooling demand being greater than an energy recovery demand. The threshold EGR cooling demand may be based on a maximum cooling a single cooler of the coolers of the cooling arrangement is configured to provide. Thus, if the EGR cooling demand is greater than the threshold EGR cooling demand, then both coolers may be needed to meet the EGR cooling demand and first mode conditions may be met. In one example, both the first cooler 5a and the second cooler 5b receive EGR, where the EGR from the first and second coolers merge in the first recirculation line before flowing to the intake system 3.

Additionally or alternatively, if the EGR cooling demand is greater than the energy recovery demand, then coolant used to cool the EGR in the coolers may be sufficient to meet the energy heat recovery demand. Said another way, the heat transfer between the EGR and the coolant in one or more of the coolers of the cooling arrangement may meet the energy heat recovery demand without flowing exhaust gas for energy recovery.

If the first mode conditions are met and at least some amount of EGR cooling is desired, then the method proceeds to 606 and flows EGR to one or more of the first and second coolers. As an example, if the EGR cooling demand is less than or equal to the threshold EGR cooling demand and the EGR cooling demand is greater than or equal to the energy recovery demand, then EGR may flow to only one of the first and second coolers. In one example, the EGR flows to only the first cooler 5a, and the first control element 7 is adjusted to an open position such that EGR from the first recirculation line 4a flows to the intake system. Furthermore, the second control element 8 is moved to a closed position to fluidly seal the second recirculation line 4b from the first recirculation line 4a. Additionally, coolant may only flow to the first cooler 5a and does not flow to the second cooler 5b. As such, even if exhaust gas flows to the second cooler 5b during the first mode when only one cooler is sufficient to meet the EGR cooling demand, the exhaust gas may flow through the second recirculation line 4b to the exhaust-gas-conducting line 11 and back to the exhaust system 2.

Additionally or alternatively, if the EGR cooling demand is greater than the threshold EGR cooling demand, then EGR is directed to both the first and second coolers. In one example, the first controller element 7 is adjusted to the open position such that EGR from the first recirculation line 4a flows to the intake system. Furthermore, the second control element is moved to an open position to fluidly couple the second recirculation line 4b to the first recirculation line 4a. As such, EGR from the first cooler 5a and the second cooler 5b may mix in the first recirculation line 4a before entering the intake system 3.

The method 600 may proceed to 608 and does not flow exhaust gas for only heat recovery. As such, any exhaust gas flowing to the coolers during the first mode is directed to the intake system during the first mode. As described above, any energy recovery demands may be met during the first mode due to the EGR cooling demand being greater than the heat recovery demand.

Returning to 604, if the first mode conditions are not met, then the method 600 may proceed to 610 to determine if second mode conditions are met. In one example, first mode conditions are not met if the EGR cooling demand is less than the energy recovery demand. Second mode conditions thus may include the energy recovery demand being greater than the EGR cooling demand and the EGR cooling demand being greater than zero. Additionally or alternatively, the EGR cooling demand is less than or equal to the threshold EGR cooling demand such that a single cooler may meet the EGR cooling demand.

If the second mode conditions are met, then the method 600 may proceed to 612 to flow EGR and exhaust gas to the first and second coolers, respectively. EGR from the first cooler flows through the first recirculation line to the intake system and exhaust gas from the second cooler flows through the second recirculation line back to the exhaust system. In one example, the first control element is in the open position configured to allow gas from the first recirculation line to enter the intake system. The second control element is in the closed position configured to allow gas from the second recirculation line to enter the exhaust-gas-conducting line.

The method 600 may proceed to 614 where gas from the second recirculation line, and therefore the second cooler, does not enter the first recirculation line or mix with gas from the first cooler.

In one example, if second mode conditions are met and the energy recovery demand is greater than the threshold energy recovery demand and the EGR cooling demand is unable to meet the difference between the energy recovery demand and the threshold energy recovery demand, then one or more engine operating parameters may be adjusted to meet the energy recovery demand. For example, exhaust gas temperatures may be increased by one or more of retarding a spark timing, increasing a post-injection pressure, and the like. This may increase exhaust gas temperatures, thereby allowing the hotter exhaust gas and EGR to transfer more heat to coolant in the coolers to meet the energy recovery demand.

Returning to 610, if the second mode conditions are not met, then the method 600 may proceed to 616 to determine if third mode conditions are met. In one example, second mode conditions are not met if the EGR cooling demand is not present (e.g., zero) and the energy recovery demand is not present (e.g., zero). Thus, the third mode conditions may include the EGR cooling demand not being present and the energy recovery demand being greater than zero.

If the third mode conditions are met, the method 600 may proceed to 618 to flow exhaust gas to one or more of the first and second coolers based on the energy recovery demand. For example, if the energy recovery demand is greater than the threshold energy recovery demand, then exhaust gas is directed from the exhaust system to each of the first and second coolers. The first cooler may flow cooled exhaust gas to the first recirculation line, where gas from the first recirculation line mixes with gases from the second cooler in the exhaust-gas-conducting line before flowing back to the exhaust system. Additionally, the first control element is in a closed position such that gas in the first recirculation line may not flow to the intake system.

However, if the energy recovery demand is less than or equal to the threshold energy recovery demand, then exhaust gas is directed from the exhaust system to one or more first or second coolers. In one example, energy recovery occurs in the second cooler when the energy recovery demand is less than or equal to the threshold energy recovery demand. The second control element may be moved to a position fluidly disconnecting the first recirculation line from the exhaust-gas-conducting line such that only gases from the second recirculation line may flow to the exhaust-gas-conducting line. Additionally or alternatively, coolant flow to the first cooler may be terminated. In this way, even if the second control element is in a position where the first recirculation line is fluidly coupled to the exhaust-gas-conducting line, the exhaust gas flowing through the first cooler does not thermally communicate with coolant. Thus, exhaust gas flowing out of the first cooler is hotter than exhaust gas flowing out of the second cooler when the energy recovery demand is less than or equal to the threshold energy recovery demand.

The method 600 may proceed to 620 where the method may include not flowing cooled EGR to the intake system. In one example the intake system may receive EGR during the third mode, however, the EGR does not flow through the cooling arrangement (e.g., cooling arrangement 4 of FIGS. 1-5). This may be accomplished by adjusting the first control element to the closed position to hermetically seal the intake system from the first recirculation line.

Returning to 616, if third mode conditions are not met, then the method 600 may proceed to 622 and enter the fourth mode. In one example, the fourth mode is selected when none of the conditions for the first mode, second mode, and third mode are met. In one example, the fourth mode conditions include the EGR cooling demand being zero and the energy recovery demand being zero.

At 624, the method 600 may include adjusting the throttle element to mitigate and/or prevent exhaust gas from flowing to the first and second coolers. Additionally or alternatively, the first control element is moved to the closed position to fluidly seal the intake system from the first recirculation line.

At 626, the method 600 may include not flowing coolant to the cooling arrangement. As such, the fourth mode may not cool EGR or perform heat recovery.

Along with instructions for implementing the method 600, the controller may further include instructions for transitioning between the first, second, third, and fourth modes based on feedback from one or more of the sensors described above. As an example of a transition from the first mode to the second mode, the transition may occur in response to the energy recovery demand being greater than the EGR cooling demand and the EGR cooling demand being less than the threshold EGR cooling demand. During the transition, the second control element may be adjusted to fluidly seal the second recirculation line from the first recirculation line. However, the first control element may maintain the position held during the first mode. A position of the throttle element in the exhaust system may also remain in a similar position as that held during the first mode.

In this way, a heat exchanger system comprises two coolers arranged in a single housing. The coolers may be fluidly coupled to a shared cooling system such that thermal transfers between exhaust gas and coolant in each of the coolers may be used for energy recovery purposes. The technical effect of having two coolers arranged in a shared housing is to allow the heat exchanger system to perform energy recovery during conditions where EGR cooling may not be desired. This may allow the system to reduce cold-start times while providing a heat exchanger system that reduces packaging constraints and reduces manufacturing costs.

A method comprises flowing only exhaust-gas recirculate to a cooling arrangement during a first mode, flowing exhaust-gas recirculate and exhaust gas to the cooling arrangement during a second mode, and flowing only exhaust gas to the cooling arrangement during a third mode, where the cooling arrangement comprises a single housing having two fluidly separate coolers. A first example of the method further includes where the first mode occurs in response to an EGR cooling demand being greater than or equal to an energy recovery demand, and where the second mode occurs in response to one or more of the EGR cooling demand being less than the energy recovery demand and the EGR cooling demand being less than a threshold EGR cooling demand, and where the third mode occurs in response to the EGR cooling demand being zero and the energy recovery demand being greater than zero. A second example of the method, optionally including the first example, further includes where the threshold cooling demand is based on a maximum cooling ability of a single cooler of the coolers. A third example of the method, optionally including the first and/or second examples, further includes where a fourth mode, where the fourth mode includes not flowing coolant to the coolers of the cooling arrangement, wherein the coolant flows from a coolant system coupled to an engine. A fourth example of the method, optionally including one or more of the first through third examples, further includes where the coolers include a first cooler adjacent to a second cooler in the single housing, the first cooler being fluidly coupled to an exhaust system upstream of a throttle element and to an intake system upstream of a compressor via a first recirculation line, and where the first recirculation line is selectively fluidly coupled to the intake system via a first control element, and where the second cooler is fluidly coupled to the exhaust system at a location upstream of the throttle element and downstream of the first recirculation line via a second recirculation line, and where the second recirculation line is selectively fluidly coupled to the first recirculation line via a second control element. A fifth example of the method, optionally including one or more of the first through fourth examples, further include where the second control element is further configured to selectively couple the second recirculation line to an exhaust-gas-conducting line, the exhaust-gas-conducting line fluidly coupled to a portion of the exhaust system downstream of the throttle element.

A system comprises a cooling arrangement having a single housing comprising a first cooler adjacent to and fluidly separated from a second cooler, a single coolant system configured to flow coolant to the first and second coolers separately, and a controller with computer-readable instructions stored on non-transitory memory thereof that when executed enable the controller to flow only exhaust-gas recirculate to one or more of the first and second coolers in response to an exhaust-gas recirculate cooling demand being greater than an energy recovery demand, flow exhaust-gas recirculate and exhaust gas to the first and second coolers, respectively, in response to the energy recovery demand being greater than the exhaust-gas recirculate cooling demand, the exhaust-gas recirculate cooling demand being greater than zero, and flow only exhaust gas to one or more of the first and second coolers in response to the exhaust-gas recirculate cooling demand being zero and the energy recovery demand being greater than zero. A first example of the system further includes where the first cooler is arranged along a first recirculation line, and where the first recirculation line is fluidly coupled to an exhaust system at a first junction and to an intake system at a second junction, the second junction further comprising a first control element configured to selectively fluidly couple the first recirculation line to the intake system, where the first junction is upstream of the first cooler and the second junction is downstream of the first cooler, and where the second cooler is arranged along a second recirculation line, and where the second recirculation line is fluidly coupled to the exhaust system at a third junction upstream of the second cooler, and where the second recirculation line is fluidly coupled to the first recirculation line at a fourth junction downstream of each of the first and second coolers, and where the second recirculation line further comprises a second control element arranged at a fifth junction, the fifth junction arranged downstream of the second cooler, and where the second control element selectively fluidly couples the second recirculation line to the first recirculation line or to an exhaust-gas-conducting line, and where the exhaust gas conducting line is fluidly coupled to the exhaust system at a sixth junction, and where the sixth junction is downstream of each of the first junction, the third junction, and a throttle element. A second example of the system, optionally including the first example, further includes where exhaust-gas recirculate flows through the first recirculation line to the intake system and where exhaust gas flows through the exhaust-gas-conducting line to the exhaust system. A third example of the system, optionally including the first and/or second examples, further includes where the coolant system is further fluidly coupled to an engine. A fourth example of the system, optionally including one or more of the first through third examples, further includes where the controller further comprises instructions for not flowing coolant to the first cooler and the second cooler during a fourth mode in response to the exhaust-gas recirculate cooling demand being zero and the energy recovery demand being zero. A fifth example of the system, optionally including one or more of the first through fourth examples, further includes where the first mode further comprises flowing exhaust-gas recirculate to only one of the first or second coolers in response to the exhaust-gas recirculate cooling demand being less than or equal to a threshold exhaust-gas recirculate cooling demand, and where the third mode further comprises flowing exhaust gas to only one of the first or second cooler in response to the energy recovery demand being less than or equal to a threshold energy recovery demand, and where the threshold exhaust-gas recirculate cooling demand and the threshold energy recovery demand are based on a maximum cooling ability of one of the first and second coolers.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine comprising:
   an intake system for supplying air to the engine, an exhaust-gas discharge system for discharging exhaust gases, and an exhaust-gas recirculation arrangement which comprises at least one recirculation line, with at least one cooler and at least one control element being provided in the at least one recirculation line for the purposes of setting a predefinable exhaust-gas flow rate for recirculation, wherein at least two recirculation lines are provided, in which there is arranged in each case one cooler, the coolers being arranged in parallel and being usable independently of one another for cooling exhaust gas for the purposes of energy recovery, wherein a first recirculation line is provided comprising at least a first cooler, the first recirculation line fluidly coupled to the exhaust-gas discharge system upstream of the first cooler, the first recirculation line further fluidly coupled to the intake system downstream of the first cooler, where a first control element is arranged at a junction between the first recirculation line and the intake system;
   a second recirculation line is provided comprising at least a second cooler, the second recirculation line fluidly coupled to the exhaust gas discharge system upstream of the second cooler, and where the second recirculation line further comprises a second control element selectively fluidly coupling the second recirculation line to the first recirculation line or to an exhaust-gas-conducting line configured to return exhaust gas to the exhaust-gas discharge system, where the second control element is downstream of the second cooler; and
   the first and second coolers comprise at least one coolant-conducting jacket configured to allow coolant flowing therethrough to thermally communicate with exhaust gas.

2. The supercharged internal combustion engine of claim 1, wherein the first recirculation line branches off from the exhaust-gas discharge system so as to form a first junction point and opens into the intake system so as to form a second junction point, the first control element being arranged at the second junction point.

3. The supercharged internal combustion engine of claim 2, wherein the second recirculation line branches off from the exhaust-gas discharge system so as to form a third junction point and opens into the first recirculation line downstream of the first cooler so as to form a fourth junction point.

4. The supercharged internal combustion engine of claim 3, wherein the exhaust-gas-conducting line is provided which branches off from the second recirculation line downstream of the second cooler so as to form a fifth junction point and opens into the exhaust-gas discharge system so as to form a sixth junction point, wherein the second control element is arranged at the fifth junction point and where the sixth junction point is downstream of the first and third junction points and a throttle element arranged in the exhaust-gas discharge system, the throttle element being arranged downstream of the first and third junction points.

5. The supercharged internal combustion engine of claim 1, further comprising at least one exhaust-gas turbocharger comprising a turbine arranged in the exhaust-gas discharge system and a compressor arranged in the intake system.

6. The supercharged internal combustion engine of claim 5, where the exhaust-gas discharge system comprises an aftertreatment device arranged downstream of the turbine, and where the aftertreatment device is a particulate filter.

7. The supercharged internal combustion engine of claim 1, further comprising a liquid-type cooling arrangement provided for forming an engine cooling arrangement, and where the engine cooling arrangement is fluidly coupled to each of the coolers.

8. A method comprising: with a controller, performing the following actions:
   flowing exhaust-gas to a first cooler and a second cooler of recirculate a cooling arrangement during a first mode via a first recirculation line comprising the first cooler and a second recirculation line comprising the second cooler, wherein the first mode further comprises actuating a first valve to an open position to fluidly couple the first recirculation line to an intake system, wherein a second valve is actuated to fluidly couple the second recirculation line to the first recirculation line;
   during a second mode, flowing exhaust-gas from the first cooler to the intake system via the first valve in the open position, the second mode further comprising adjusting the second valve to fluidly couple the second recirculation line to a further exhaust-gas discharge line, wherein the second valve blocks exhaust gas flow from the second recirculation line to the first recirculation line in the second mode, wherein the exhaust-gas discharge line is configured to flow exhaust gas to an exhaust-gas discharge system; and
   flowing exhaust gas to the first and second coolers during a third mode, wherein the first valve is actuated to block exhaust flow from the first recirculation line to the intake system and the second valve is adjusted to flow exhaust gas from the first and second coolers to the exhaust-gas discharge line.

9. The method of claim 8, wherein the first mode occurs in response to an EGR cooling demand being greater than or equal to an energy recovery demand, and where the second mode occurs in response to one or more of the EGR cooling demand being less than the energy recovery demand and the EGR cooling demand being less than a threshold EGR cooling demand, and where the third mode occurs in response to the EGR cooling demand being zero and the energy recovery demand being greater than zero.

10. The method of claim 9, wherein the threshold EGR cooling demand is based on a maximum cooling ability of a single cooler of the first and second coolers.

11. The method of claim 8, further comprising a fourth mode, where the fourth mode includes not flowing coolant to the first and second coolers of the cooling arrangement, wherein the coolant flows from a coolant system coupled to an engine.

12. The method of claim 8, wherein the first cooler is adjacent to the second cooler in a single housing, the first cooler being fluidly coupled to the exhaust-gas discharge system upstream of a throttle element and to the intake system upstream of a compressor via the first recirculation line, and where the second cooler is fluidly coupled to the exhaust-gas discharge system at a location upstream of the throttle element and downstream of the first recirculation line via the second recirculation line, wherein the throttle element is moved to a closed position in each of the first, second, and third modes.

13. The method of claim 12, wherein the exhaust-gas discharge line is fluidly coupled to a portion of the exhaust-gas discharge system downstream of the throttle element.

14. A system comprising:
a cooling arrangement having a single housing comprising a first cooler adjacent to and fluidly separated from a second cooler, the first cooler arranged along a first recirculation line and the second cooler arranged along a second recirculation line, wherein the first recirculation line is selectively coupled to an intake system via a first control element, wherein the first recirculation line and the second recirculation line are selectively coupled to one another via a second control element;
a single coolant system configured to flow coolant to the first and second coolers separately; and
a controller with computer-readable instructions stored on non-transitory memory thereof that when executed enable the controller to:
flow exhaust-gas to the first and second coolers in response to an exhaust-gas recirculate cooling demand being greater than an energy recovery demand during a first mode where the exhaust gas from each of the first and second coolers flows to the intake system;
flow exhaust gas to the first and second coolers in response to the energy recovery demand being greater than the exhaust-gas recirculate cooling demand during a second mode, where the exhaust-gas recirculate cooling demand is greater than zero, wherein exhaust gas from the first cooler flows to the intake system and exhaust gas from the second cooler flows to an exhaust-gas-conducting line fluidly coupled to an exhaust-gas discharge system and
flow exhaust gas to one or more of the first and second coolers in response to the exhaust-gas recirculate cooling demand being zero and the energy recovery demand being greater than zero, wherein exhaust gas from the first and second coolers flows to the exhaust-gas-conducting line via the second control element.

15. The system of claim 14, wherein the first recirculation line is fluidly coupled to the exhaust-gas discharge system at a first junction and to the intake system at a second junction, the second junction further comprising the first control element configured to selectively fluidly couple the first recirculation line to the intake system, where the first junction is upstream of the first cooler and the second junction is downstream of the first cooler, wherein the second recirculation line is fluidly coupled to the exhaust-gas discharge system at a third junction upstream of the second cooler, and where the second recirculation line is fluidly coupled to the first recirculation line at a fourth junction downstream of each of the first and second coolers, and where the second recirculation line further comprises the second control element arranged at a fifth junction, the fifth junction arranged downstream of the second cooler, and where the second control element selectively fluidly couples the second recirculation line to the first recirculation line or to the exhaust-gas-conducting line, and where the exhaust-gas-conducting line is fluidly coupled to the exhaust-gas discharge system at a sixth junction, and where the sixth junction is downstream of each of the first junction, the third junction, and a throttle element.

16. The system of claim 15, wherein exhaust-gas in the exhaust-gas discharge line flows to only the exhaust-gas discharge system.

17. The exhaust system of claim 14, wherein the coolant system is further fluidly coupled to an engine.

18. The exhaust system of claim 14, wherein the controller further comprises instructions for not flowing coolant to the first cooler and the second cooler during a fourth mode in response to the exhaust-gas recirculate cooling demand being zero and the energy recovery demand being zero.

19. The exhaust system of claim 14, wherein the first mode further comprises flowing exhaust-gas to only one of the first or second coolers in response to the exhaust-gas recirculate cooling demand being less than or equal to a threshold exhaust-gas recirculate cooling demand, and where the third mode further comprises flowing exhaust gas to only one of the first or second cooler in response to the energy recovery demand being less than or equal to a threshold energy recovery demand, and where the threshold exhaust-gas recirculate cooling demand and the threshold energy recovery demand are based on a maximum cooling ability of one of the first and second coolers.

* * * * *